March 14, 1967   A. J. ANTHONY   3,309,118
COUPLING JOINT FOR NUCLEAR REACTOR CONTROL ROD ARRANGEMENT
Filed May 24, 1964   2 Sheets-Sheet 1
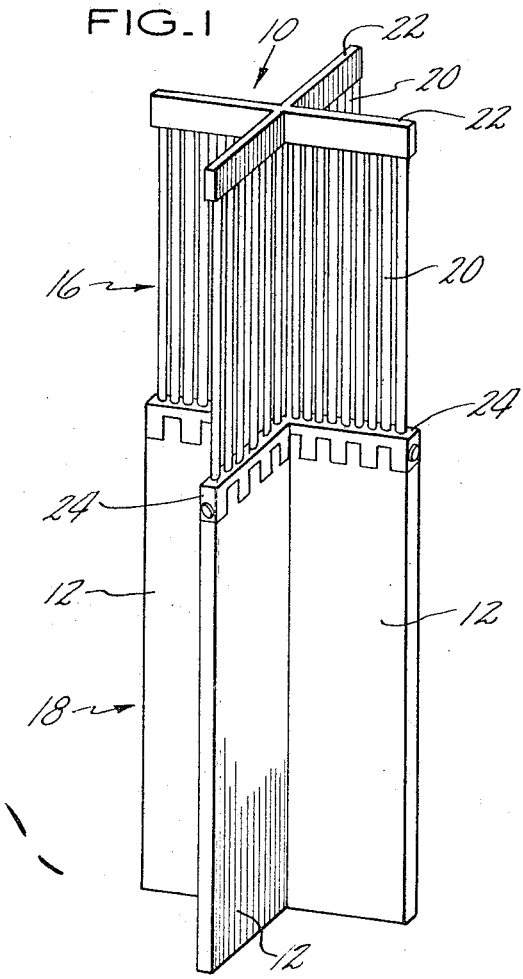
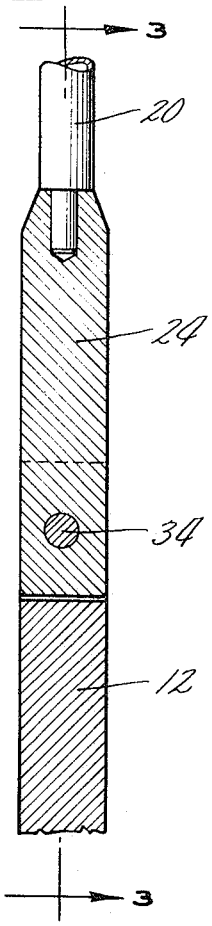
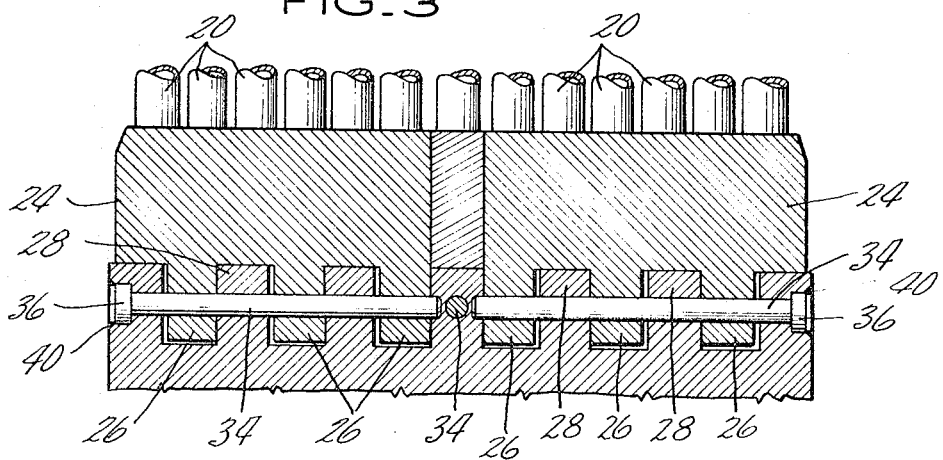

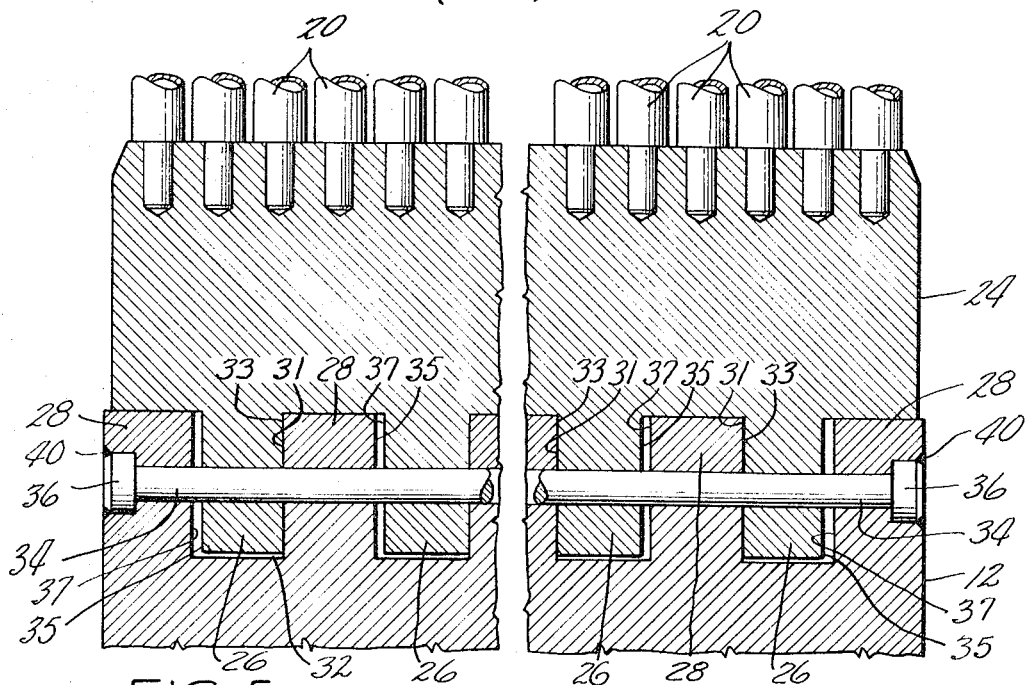
FIG. 4 (COLD)
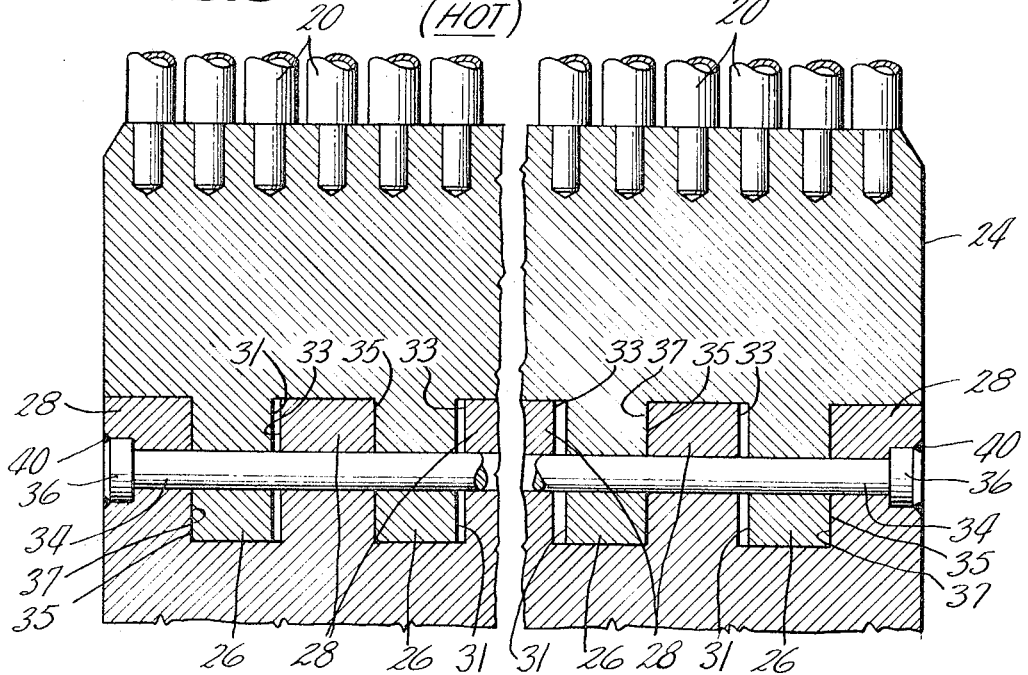
FIG. 5 (HOT)

United States Patent Office 3,309,118
Patented Mar. 14, 1967

3,309,118
COUPLING JOINT FOR NUCLEAR REACTOR
CONTROL ROD ARRANGEMENT
Andrew J. Anthony, Tariffville, Conn., assignor to Combustion Engineering, Inc., Windsor, Conn., a corporation of Delaware
Filed May 24, 1965, Ser. No. 458,330
1 Claim. (Cl. 287—103)

This is a continuation-in-part of application Ser. No. 334,324, filed Dec. 30, 1963, now abandoned.

This invention relates generally to nuclear reactors and is specifically concerned with an improved control rod assembly for a nuclear reactor and which assembly includes a so-called poison or control portion and a follower portion.

In nuclear reactors cooled by a fluid which is a good moderator, such as water or steam cooled reactors, and which reactors are of the heterogeneous type being controlled at least to some degree by control rods that are movable with respect to the reactor core, it is often the practice to provide a control rod assembly which includes a poison or control portion and a follower portion. The poison portion contains material that has a high neutron absorption cross-section and accordingly when this portion is within the reactor core it effects a decrease in reactivity. The follower portion, in contrast, is fabricated of a material that has a very low neutron absorption cross-section with the purpose of this follower portion being to occupy the volume formerly occupied by the poison portion prior to its withdrawal thereby preventing this volume from being filled by the moderator-coolant which would cause a substantial maldistribution of moderator within the core of the reactor resulting in what is termed in water cooled and moderated reactors severe "water gap peaking."

The two sections of this composite control rod assembly are accordingly made of different materials which have substantially different co-efficients of expansion. Since the assembly must be fabricated into a single integrated unit which will move with respect to the reactor core, these two portions of the assembly must be secured together in a manner which will assure that the integrity of the assembly will be maintained during operation of the unit and that a satisfactory operating control rod will be provided. A malfunction of a control rod can be extremely serious, and it is, of course, a major catastrophe when a reactor must be shut down and access had to the core thereof because of an improperly operating control rod.

In accordance with the present invention the control rod assembly is of the blade type wherein flat blade portions are provided which are arranged in a cruciform configuration such that four branches extend laterally outward from the central region of the rod. The poison or control portion of the rod assembly is secured to the follower portion by means of intermeshed projections formed upon these two portions with a pin being received in aligned openings provided in these projections. The relative disposition and configuration of the projections with relation to the relieved portions or recesses within which they are received is such as to provide for optimum strength and allow for the necessary differential expansion between these two portions of the assembly that is encountered because of the temperature variation to which the assembly is subjected during use.

Accordingly, it is an object of this invention to provide an improved control rod assembly.

Another object of this invention is to provide an improved control rod assembly wherein the assembly is elongated and of cruciform transverse section with there being a control portion and a follower portion and with the construction being such as to provide optimum support while accommodating the necessary differential expansion between the follower and control portions.

Other and further objects of the invention will become apparent to those skilled in the art as the description proceeds.

With the aforementioned objects in view, the invention comprises an arrangement, construction and combination of the elements of the inventive organization in such a manner as to attain the results desired, as hereinafter more particularly set forth in the following detailed description of an illustrative embodiment, said embodiment being shown by the accompanying drawing wherein:

FIGURE 1 is a perspective view of the control rod assembly of the invention;

FIGURE 2 is a fragmentary longitudinal sectional view taken at 90° with respect to one of the control rod assembly blades and at the juncture of the poison portion with the follower portion;

FIGURE 3 is a sectional view taken generally along line 3—3 of FIGURE 2;

FIGURE 4 is an enlarged and fragmentary view somewhat in the nature of FIGURE 3 and showing in detail the disposition of the intermeshed projections of the control portion and the follower portion of the rod assembly when the assembly is in a cold condition; and FIGURE 5 is a view similar to that of FIGURE 4 but showing the disposition of the intermeshed portions when the assembly is in a hot condition.

Referring now to the drawing, wherein like reference characters are used throughout to designate like elements, the illustrative and preferred embodiment of the invention depicted therein includes the control rod assembly 10 that is of cruciform transverse section having a pair of blades arranged at right angles to each other such that there are provided four branches 12 that extend outwardly from the center of the rod assembly and are effectively joined at the center. The assembly includes a control or poison section 16 and a follower section 18 which is secured to and effectively forms an extension of the control section 16.

In the illustrative embodiment the poison section 16 is made up of a plurality of relatively small diameter tubular members 20 with these tubular members being coplanar and in parallel adjacent relation in each branch 12, as shown in FIGURES 2, 3 and 4. These tubes are connected, as shown, at their upper ends with the header plate 22 and at their lower ends with header plate 24. The tubes are preferably fabricated of stainless steel as are header plates 22 and 24 and positioned within the tubes is a material that contains a so-called neutron poison or in other words has a large neutron absorption cross-section such as boron, hafnium or cadmium.

The follower section 18 which is fabricated of a material that has a low neutron absorption cross-section, such as zirconium, is of the same general thickness and width as the header plate 24 and is connected with this header plate by means of a high strength connection will permit the necessary differential thermal expansion between header plate 24 and the follower section 18 encountered during use of the control rod. Since the header plate and the follower section are constructed of different material, they have different co-efficients of expansion with the co-efficient of expansion of stainless steel, in the illustrative embodiment, being substantially greater than that of zirconium. Since these control blades have a temperature variation from room temperature to the very high temperature that prevails during operation of the reactor, it is necessary that provisions be made to accommodate the differential thermal expansion that is encountered, in order to assure that excessive stresses at the juncture or connection of the control to the follower section of these control rod assemblies are not produced.

This result is achieved with the present invention while at the same time providing an interconnection of these two members which is of an optimum and high strength quality. In accordance with the invention there is formed at the lower extremity of the header plates 24 a plurality of downwardly extending projections 26. These projections are placed in uniformly spaced relation along the header plate 24. Each of the branches 12 of the follower blade portion 18 are provided at their upper extremity with similar projections herein identified as 28 with these projections being offset with relation to the projections 26 such that the projections intermesh as disclosed in the drawings.

In order to have a connection between the control and follower portions of the control rod assembly which will provide maximum strength quality, it is desired that the width of the intermeshed projections as viewed in FIGURES 3, 4 and 5 be the maximum permissible. Since each of the branches of the control rod assembly are connected centrally of the assembly, the expansion from a cold to a hot condition takes place axially of the assembly in an outward direction. Thus since the header plates 24, which may be of stainless steel have a substantially greater co-efficient of expansion than the branches of the follower, which may be of zirconium, the header plates 24 will move outwardly from the center of the control rod assembly and relative to the blades of the follower portion 18 as the temperature of the assembly rises from room temperature to the high operating temperature encountered in a reactor.

In order to provide the aforementioned optimum strength and to also accommodate this thermal expansion, the inner region 31 of the projections 26, as best shown in FIGURE 4, is juxtaposed to the outer region 33 of the projections 28 when the control rod assembly is in its cold condition. These two regions are effectively in engagement or are as close to one another as is possible with reasonable machining tolerances and accuracies. The outer region 35 of the projections 26 is, however, spaced from the inner region 37 of the projections 28 when the assembly is in this cold condition with this spacing being sufficient in magnitude to accommodate the differential thermal expansion encountered in elevating the temperature of the assembly from room temperature to the aforementioned operating temperature. The space is only just sufficient to accommodate the differential expansion that is encountered such that the width of the projections 26 and the width of the projections 28 are the maximum that may be obtained. With this arrangement when the assembly is elevated to its operating temperature, the projections 26 will move laterally outward within the recesses between the projections 28 so that at operating temperature the outer region of the projections 26 will be adjacent the inner regions of the projections 28 with this condition being shown in FIGURE 5.

Since there will be some slight differential expansion between the projections 26 and 28 which will cause the projection 26 to extend somewhat further downwardly into the recesses between the projection 28, there is provided, when the assembly is in a cold condition, a sufficient space 32 at the end of the projection 26 to accommodate this differential expansion.

The intermeshed projections 26 and 28 of each of the branches are provided with aligned openings into and through which extends the pin 34. One such pin is provided for each of the four branches of the assembly and the pin is inserted from the outer extremity of the branch with the pin being provided with a head 36 received within a suitable counterbore. The pin is positively secured in place by means of welding at the location identified as 40.

With this arrangement a connection between the control portion and the follower portion of the control rod assembly is provided which is of optimum strength and with this connection being such as to readily facilitate the differential expansion that necessarily occurs in a control rod assembly of the nature of that to which the invention pertains.

While I have illustrated and described a preferred embodiment of my invention it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

What I claim is:

A coupling joint for joining a pair of members which are of similar cruciform transverse configuration with the four laterally extending branches of the cruciform being centrally joined, said members being axially aligned with their cruciform branches co-planar, the branches of one of said members being provided at one extremity with a plurality of depending projections with each branch having at least two such projections and with the projections being in spaced relation, an extremity of the branches of the other member being similarly formed with the projections on said one and other members being so related that they intermesh, said one member being comprised of a material the co-efficient of thermal expansion of which is substantially greater than that of said other member, said members being adapted to be subjected to wide temperature variations between a lower and an upper limit, the projections forming part of said one member and disposed intermediate the projections of said other member having their innermost region juxtaposed the outermost region of the projections of said other member when said members are at a temperature corresponding to said lower limit and, when at this temperature, the outer region of the projections of said one member being spaced from the inner region of the projections of said other member a sufficient distance to accommodate the thermal expansion that takes place when the temperature of said members is raised from said lower limit to said upper limit with the outermost region of the projections of said one member being adjacent the innermost region of the projections of said other member when at said upper limit, aligned openings in said projections, pin means snugly disposed in and extending through said aligned openings of each of the branches from the outer region inward and the pin means being welded in place whereby a joint or optimum strength is produced with the width of the intermeshed projections being the maximum permissible and still accommodate the required differential thermal expansion.

References Cited by the Examiner

UNITED STATES PATENTS

| | | | |
|---|---|---|---|
| 2,991,098 | 7/1961 | Vanwersch et al. | 287—64 |
| 3,034,814 | 5/1962 | Frisch et al. | 287—103 |
| 3,048,532 | 8/1962 | Thorp | 176—86 |
| 3,138,536 | 6/1964 | Murray et al. | 176—86 |
| 3,163,583 | 12/1964 | Widmer et al. | 176—86 |

FOREIGN PATENTS 833,072   4/1960   Great Britain.

CARL D. QUARFORTH, *Primary Examiner.*

L. DEWAYNE RUTLEDGE, *Examiner.*

H. E. BEHREND, *Assistant Examiner.*